(12) United States Patent  
Timashev et al.

(10) Patent No.: US 8,566,640 B2  
(45) Date of Patent: *Oct. 22, 2013

(54) SYSTEMS, METHODS, AND COMPUTER PROGRAM PRODUCTS FOR INSTANT RECOVERY OF IMAGE LEVEL BACKUPS

(75) Inventors: Ratmir Timashev, Baar (CH); Anton Gostev, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 275 days.

This patent is subject to a terminal disclaimer.

(21) Appl. No.: 13/185,036

(22) Filed: Jul. 18, 2011

(65) Prior Publication Data

US 2012/0017114 A1   Jan. 19, 2012

Related U.S. Application Data

(60) Provisional application No. 61/365,721, filed on Jul. 19, 2010.

(51) Int. Cl.  
*G06F 11/00* (2006.01)

(52) U.S. Cl.  
USPC ................................................. 714/15; 718/1

(58) Field of Classification Search  
USPC .............. 714/15, 16, 20, 21, 4.11, 6.3; 718/1, 718/100; 707/602; 711/162, 161  
See application file for complete search history.

(56) References Cited

U.S. PATENT DOCUMENTS

| | | |
|---|---|---|
| 4,912,628 A | 3/1990 | Briggs |
| 5,133,065 A | 7/1992 | Cheffetz et al. |
| 5,487,160 A | 1/1996 | Bemis |
| 5,535,381 A | 7/1996 | Kopper |
| 5,713,024 A | 1/1998 | Halladay |
| 5,758,165 A | 5/1998 | Shuff |
| 5,835,953 A | 11/1998 | Ohran |
| 5,907,672 A | 5/1999 | Matze et al. |

(Continued)

FOREIGN PATENT DOCUMENTS

EP     0 899 662 A1     3/1999

OTHER PUBLICATIONS

Notification of Transmittal of the International Search Report and the Written Opinion of the International Searching Authority, or the Declaration, for International Application No. PCT/US2011/04435, mailed Feb. 9, 2012.

(Continued)

*Primary Examiner* — Dieu-Minh Le  
(74) *Attorney, Agent, or Firm* — Sterne, Kessler, Goldstein & Fox P.L.L.C.

(57) ABSTRACT

Systems, methods, and computer program products are provided for instant recovery of a virtual machine (VM) from a compressed image level backup without fully extracting the image level backup file's contents to production storage. The method receives restore parameters and initializes a virtual storage. The method attaches the virtual storage to a hypervisor configured to launch a recovered VM. The method stores virtual disk data changes inflicted by a running operating system (OS), applications, and users in a changes storage. The method provides the ability to migrate the actual VM disk state (taking into account changed disk data blocks accumulated in changes storage) so as to prevent data loss resulting from the VM running during the recovery and accessing virtual storage, to production storage without downtime. In embodiments, the method displays receives restore parameters in an interactive interface and delivers the recovery results via an automated message, such as an email message.

21 Claims, 11 Drawing Sheets

(56) References Cited

U.S. PATENT DOCUMENTS

| | | | |
|---|---|---|---|
| 5,974,547 | A | 10/1999 | Klimenko |
| 6,038,570 | A | 3/2000 | Hitz et al. |
| 6,047,294 | A | 4/2000 | Deshayes et al. |
| 6,061,770 | A | 5/2000 | Franklin |
| 6,076,148 | A | 6/2000 | Kedem |
| 6,081,875 | A | 6/2000 | Clifton et al. |
| 6,205,527 | B1 | 3/2001 | Goshey et al. |
| 6,421,777 | B1 | 7/2002 | Pierre-Louis et al. |
| 6,434,681 | B1 | 8/2002 | Armangau |
| 6,604,118 | B2 | 8/2003 | Kleiman et al. |
| 6,691,245 | B1 | 2/2004 | DeKoning |
| 6,735,692 | B1 | 5/2004 | Murphrey et al. |
| 6,795,966 | B1 | 9/2004 | Lim et al. |
| 6,799,258 | B1 | 9/2004 | Linde |
| 6,823,376 | B1 | 11/2004 | George et al. |
| 6,917,963 | B1 | 7/2005 | Hipp et al. |
| 6,931,558 | B1 | 8/2005 | Jeffe et al. |
| 7,024,527 | B1 | 4/2006 | Ohr |
| 7,043,485 | B2 | 5/2006 | Manley et al. |
| 7,093,086 | B1 | 8/2006 | van Rietschote |
| 7,191,299 | B1 | 3/2007 | Kekre et al. |
| 7,240,239 | B2 | 7/2007 | Suzaki |
| 7,254,682 | B1 | 8/2007 | Arbon |
| 7,480,822 | B1 | 1/2009 | Arbon et al. |
| 7,546,364 | B2 | 6/2009 | Raman et al. |
| 7,831,861 | B1 | 11/2010 | Greene et al. |
| 8,117,168 | B1 | 2/2012 | Stringham |
| 8,332,689 | B2 * | 12/2012 | Timashev et al. ............... 714/15 |
| 2002/0049718 | A1 | 4/2002 | Kleiman et al. |
| 2003/0101321 | A1 | 5/2003 | Ohran |
| 2003/0158873 | A1 | 8/2003 | Sawdon et al. |
| 2004/0107222 | A1 | 6/2004 | Venkatesh et al. |
| 2008/0275924 | A1 | 11/2008 | Fries |
| 2009/0094603 | A1 | 4/2009 | Hiltgen et al. |
| 2009/0150510 | A1 | 6/2009 | Kovacs et al. |
| 2009/0222496 | A1 | 9/2009 | Liu et al. |
| 2009/0313447 | A1 | 12/2009 | Nguyen et al. |
| 2010/0107158 | A1 | 4/2010 | Chen et al. |
| 2010/0292982 | A1 | 11/2010 | Dube et al. |
| 2011/0202728 | A1 | 8/2011 | Nichols et al. |
| 2012/0102135 | A1 | 4/2012 | Srinivasan et al. |

OTHER PUBLICATIONS

Amrehn, E., et al., "Web Server Solutions for VM/ESA," International Business Machines Corporation, Second Edition, United States (Dec. 1998).
Anderson, G.W., "Client/Server Database Design with Sybase—A High-Performance and Fine-Tuning Guide: Features System 11," McGraw-Hill Companies, Inc. (1997).
"Backup Agent for Oracle Server, Option Guide, Netware Edition," Computer Associates International, Inc., United States (2000).
"Bare Metal Restore User Guide, for Tivoli Storage Manager," The Kernel Group, Inc., Version 1.4.3, United States (Mar. 2001).
Barker, R., et al., "Storage Area Network Essentials: a Complete Guide to Understanding and Implementing SANs," John Wiley & Sons (2002).
Bibliographic and Continuity Data for U.S. Patent 6,931,558, filed Nov. 30, 2001.
Campbell, I., "Reliable Linux—Assuring High Availability," John Wiley & Sons, Inc. (2002).
Castets, G., et al., "IBM TotalStorage Enterprise Storage Server Model 800," International Business Machines Corporation, Second Edition United States (Oct. 2002).
Clark, T., "Designing Storage Area Networks—Second Edition," Pearson Education, Inc. (2003).
Clifford, C.B., "Sybase Replication Server Primer," McGraw-Hill, Inc. (1995).
Compton, J., "VM Ware 2 for Linux," Prima Publishing (2000).
"Dell OpenManage Remote Assistant Card Version 2.x User's Guide," Dell Computer Corporation, (Sep. 1999).
Elnozahy, E.N. et al., "The Performance of Consistent Checkpointing," IEEE, pp. 39-47 (1992).
Email from M. Ramundo to LISTRV give-and-take forum, "Re: Backing up Listserv Files," dated May 13, 1996.
Farley, M., "Building Storage Networks, Second Edition," Osborne/McGraw-Hill (2001).
Friess, B., et al., "Windows NT Backup and Recovery with ADSM," International Business Machines Corporation, First Edition, United States, (May 1998).
"Getting Started Guide VMware 2.0 for Linux," VMware, Inc., United States (2000).
Goldberg, G., et al., "The VM/ESA Systems Handbook," McGraw-Hill, Inc. (1993).
Green, R.J. et al., "Designing a Fast, On-line Backup System for a Log-structured File System," *Digital Technical Journal* 8(2):32-45 (1996).
"IBM Virtual Machine/System Product: CP Command Reference for General Users, Release 4, SC19-6211-3," International Business Machines Corporation, Fourth Edition, United States (Dec. 1984).
"IBM Virtual Machine/System Product: General Information, Release 4, GC20-1838-4," International Business Machines Corporation, Fifth Edition, United States (Jun. 1984)
U.S. Appl. No. 76/062862, filed Jun. 5, 2000.
Jepson, T.C., "Distributed Storage Networks—Architecture, Protocols and Management," John Wiley & Sons, Ltd. (2003).
Lee, E.K., and Thekkath, C.A., "Petal: Distributed Virtual Disks," *Proceedings of the 7th International Conference on Architectural Support for Programming Languages and Operating Systems*, pp. 1-9, Association for Computing Machinery (1996).
Lewis, A.J., "LVM HowTo," Revision 1.5, Sistina Software, Inc. (2003).
Li, K. et al., "Low-Latency, Concurrent Checkpointing for Parallel Programs," *IEEE Transactions on Parallel and Distributed Systems*,5(8):874-879, IEEE (1994).
Li, K. et al., "Real-Time, Concurrent Checkpoint for Parallel Programs," pp. 79-88, Association for Computing Machinery (1990).
Luber, A., "PC Fear Factor—The Ultimate PC Disaster Prevention Guide," Que Publishing (2003).
Macisaac, M., "Linux on IBM eserver zSeries and S/390: ISP/ASP Solutions," International Business Machines Corporation, First Edition, United States (Dec. 2001).
"MCSE Windows 2000 Professional Study Guide (Exam 70-210)," Osborne McGraw-Hill (2000).
"Microsoft Computer Dictionary—Fifth Edition," Microsoft Press (2002).
Pate, A. et al., "Implementing DFSMSdss SnapShot and Virtual Concurrent Copy," International Business Machines Corporation, First Edition, United States (Jun. 1998).
Petition Decision, Preliminary Amendment, and Petition in the application history for U.S. Patent No. 6,931,558, dated Dec. 2001 to May 2002.
Plank, J.S. et al., "Libckpt: Transparent Checkpointing under Unix," *USENIX Winter 1995 Technical Conference*, United States (Jan. 1995).
Poelker, C. et al., "Storage Area Networks for Dummies," Wiley Publishing, Inc. (2003).
Preston, W.C., "Unix Backup & Recovery," O'Reilly & Associates, Inc. (1999).
"QUIESCE Command," accessed on VM:Webgateway at http://204.146.168.194/VM:Webgateway/Help/Commands/Quiesce, Sterling Software, Inc., 3 pages (1998).
Quinlan, S., "A Cached WORM File System," *Software—Practice and Experience*, 21(12):1289-1299, John Wiley & Sons, Ltd. (1991).
Schulz, G., "Resilient Storage Networks—Designing Flexible Scalable Data Infrastructures," Elsevier Digital Press (2004).
Siever, E., "Linux in a Nutshell, Second Edition," O'Reilly & Associates, Inc. (1999).
Simitci, H., "Storage Network Performance Analysis," Wiley Publishing, Inc. (2003).
Spalding, R., "The Complete Reference—Storage Networks," McGraw-Hill/Osborne (2003).
Stringfellow, S. et al., "Backup and Restore Practices for Sun Enterprise Servers," Sun Microsystems, Inc. (2000).

(56) References Cited

OTHER PUBLICATIONS

Suzaki, K., "Checkpoint for Network Transferable Computer," National Institute of Advanced Industrial Science and Technology, Information Technology Research Institute, Japan (Certified Translation completed May 2012).
Suzaki, K., "Checkpoint for Network Transferable Computer," National Institute of Advanced Industrial Science and Technology, Information Technology Research Institute, Japan (Jul. 2001) (Certification Form).
Suzaki, K., "Checkpoint for Network Transferable Computer," National Institute of Advanced Industrial Science and Technology, Information Technology Research Institute, Japan (Jul. 2001) (Original in Japanese).
Suzaki, K., "Network Transferable Computer (NTC)," accessed at http://staff.aist.go.jp/k.suzaki/English/NTC/MST2000/MSTen.pdf, revised Sep. 2002, 2 pages.
Suzaki, K., "Network Transferable Computer," accessed at http://staff.aist.go.jp/k.suzaki/English/NTC/index.html, revised Sep. 2002, 8 pages.
Suzaki, K., "Network Transferable Computer," presentation at University of Illinois at Urbana Champaign, presented Jan. 24, 2001.
Suzaki, K., "Network Transferable Computer" accessed at http://staffaist.go.jp/k.suzaki/English/NTC/SC2001.pdf, revised Sep. 2002, 2 pages.
Tate, J. et al., "Introduction to SAN Distance Solutions," International Business Machines Corporation, First Edition, United States (Jan. 2002).
Theimer, M.M. "Preemptable Remote Execution Facilities for Loosely-Coupled Distributed Systems," Marvin M. Theimer (1986).
Theimer, M.M., et al., "Preemptable Remote Execution Facilities for the V-System," Association for Computing Machinery, pp. 2-12 (1985).
Toigo, J.W., "The Holy Grail of Network Storage Management," Prentice Hall PTR (2004).
Tretau, R., et al., "IBM TotalStorage NAS Backup and Recovery Solutions," International Business Machines Corporation, First Edition, United States (Jul. 2002).
Tretau, R., et al., "Implementing the IBM TotalStorage NAS 300G: High Speed Cross Platform Storage and Tivoli SANergy!" International Business Machines Corporation, First Edition, United States (Sep. 2001).
Tretau, R., et al., "The IBM TotalStorage NAS 200 and 300 Integration Guide," International Business Machines Corporation, First Edition, United States (Jan. 2002).
"User's Manual VMware ESX Server Version 1.0," VMware, Inc., United States (2001).
"User's Manual VMware ESX Server Version 1.1," VMware, Inc., United States (2001).
"User's Manual VMware GSX Server Version 1.0 for Linux," VMware, Inc., United States (2001).
"User's Manual VMware GSX Server Version 1.0 for Windows NT and Windows 2000," VMware, Inc., United States (2001).
"User's Manual VMware Workstation Version 3.0," VMware, Inc., United States (2001).
Vacca, J., "The Essential Guide to Storage Area Networks," Prentice Hall PTR (2002).
"Virtual Machine/System Product CP General User Command Reference Release 6," International Business Machines Corporation, Sixth Edition, United States (Jul. 1988).
"Virtual PC for Macintosh, Version 4.0, User Guide," Connectix Corporation, United States (Dec. 2000).
"Virtual PC for Windows, Version 4.0, User Guide," Connectix Corporation, United States (Jun. 2001).
"VMBackup User's Guide," VM Software, Inc., Release 5.1 (Aug. 1989).
Wang, Y.M., et al., "Integrating Checkpointing with Transaction Processing," *Proc. 27th Intl. Symp. Fault-Tolerant Computing*, IEEE, pp. 304-308 (1997).
Ward, B., "The Book of VMware: The Complete Guide to VMware Workstation," No Starch Press (2002).
Worden, D.J., "Storage Networks," Apress (2004).
"Worker Machines," accessed on VMWebgateway at http://204.146.168.194/VM:Webserver/help/ovwwrkr.html, Sterling Software, Inc., 2 pages. (1998).
"z/VM: CP Command and Utility Reference, Version 3, Release 1.0," International Business Machines Corporation, First Edition, United States (Feb. 2001).
"z/VM: General Information, Version 3, Release 1.0," International Business Machines Corporation, Second Edition, United States (Jan. 2001).
"BrightStor VM: Backup-Operator's Guide 3.3B," Computer Associates International, Inc., accessed at http://www.tamu-commerce.edu/ctis/vmbackupdocs/backup/bacvo331.pdf (1996).
"BrightStor VM: Backup-System Administrator's Guide 3.3B," Computer Associates International, Inc., accessed at http://www.tamu-commerce.edu/ctis/vmbackupdocs/backup/bacvs331.pdf (1996).
"BrightStor VM: Backup-System Programmer's Reference 3.3B," Computer Associates International, Inc., accessed at http://www.tamu-commerce.edu/ctis/vmbackupdocs/backup/bacvp331.pdf (1996).
"BrightStor VM: Backup-User's Guide 3.3B," Computer Associates International, Inc., accessed at http://www.tamu-commerce.edu/ctis/vmbackupdocs/backup/bacvu331.pdf (1996).

\* cited by examiner

SYSTEMS, METHODS, AND COMPUTER PROGRAM PRODUCTS FOR INSTANT RECOVERY OF IMAGE LEVEL BACKUPS

CROSS-REFERENCE TO RELATED APPLICATIONS

The present application claims the benefit of U.S. Provisional Patent Application No. 61/365,721, filed on Jul. 19, 2010, entitled "Systems, Methods, and Computer Program Products for instant Recovery of image Level Backups," which is incorporated by reference herein in its entirety.

FIELD OF THE INVENTION

The present invention is related to data backup and recovery. In particular, the present invention relates to methods, systems, and computer program products for instant recovery of virtual machines stored in an image level backup.

BACKGROUND OF THE INVENTION

The speed of recovery during disaster has been a concern throughout the era of the personal computer and distributed client-server systems. Backup administrators and restore operators need to ensure they are meeting Recovery Time Objectives (RTOs) and Service Level Agreement levels (SLAB) for all mission-critical applications and servers.

Traditional methods of recovering image level backups include the complete restoration of an image-level backup into a production environment. Traditional recovery techniques also do not allow users to access and use data sets being restored while a restoration is ongoing.

For virtual machines, backups and restorations are typically performed at the image level, so the data size that needs to be restored can be overwhelming. For example, restoring a file server virtual machine (VM) with 1 terabyte (TB) disk can take up to 8 hours on a 1 gigabit (Gb) network.

In order to conserve storage space, backup files themselves are typically highly compressed and/or de-duplicated. For example, some commercially available backup tools, such as VEEAM™ Backup from Veeam Software International Ltd., provide mechanisms for de-duplication and compression of image level backup files. Deduplication may be applied when backing up multiple virtual machines (VMs) that have similar data blocks within them. For example, if VMs were created based on the same template, or if VMs with a large amount of free space on their logical disks are backed up, deduplication of backups of the VMs can reduce storage space required for the backups of those VMs.

Another means for decreasing the backup size is compression. Again, while compression decreases the size of created backup files, it increases the duration for backup creation, verification, restoration, and recovery procedures.

In order to enhance security, backup files are also often encrypted.

Thus, in an initial restoration step, backup files may need to be extracted (i.e., decompressed) and/or decrypted completely before their contents can be read. The extracted VM data are then copied to a target production environment. Using traditional techniques, restoration and recovery process can take hours depending on the size of the VM to be restored, because large amounts of data need to be extracted and moved across from the backup storage to the production storage. The time required to copy the extracted VM image data over to production storage is the primary factor affecting overall duration of the traditional recovery process.

Finally, the VM is registered with a virtual environment and started. If the VM or applications inside it do not start due to an image level backup being unrecoverable, the process of recovery needs to be repeated using different backup files, until a viable, working backup file is found and the restored VM is running as expected—which concludes the traditional recovery process.

In order to verify the functionality of data restored from image level backups, some traditional recovery techniques stage restored data on isolated, test networks and servers. This results in the need for additional time to first stage recovered data objects in a test environment before it is made available in a production environment.

Thus, traditional image-level recovery processes are resource intensive, inefficient, and as a result, may take hours to complete—primarily due to having to copy very large amounts of data from an image level backup file to a production environment. This can prevent users from using production data and applications during the restore process. This can also often jeopardize achieving RTOs and SLAs resulting in extended and costly downtime for production systems.

Therefore, there is a need for an efficient method of quick recovery of VMs from image-level backups to production environment. There is also a need for methods and systems which allow users to access data sets while a restoration is running.

SUMMARY OF THE INVENTION

Embodiments of the invention include methods, systems, and computer program products for instant recovery of a VM from an image level backup to a production environment. Example methods for restoring and verifying a VM from a compressed/deduplicated/encrypted image level backup without prior full VM image extraction are described in U.S. Provisional Patent Application No. 61/250,586, filed on Oct. 12, 2009, and entitled "Item-Level Restoration From Image Level Backup," U.S. patent application Ser. No. 12/901,233, filed on Oct. 8, 2010 entitled "Item-Level Restoration from Image Level Backups," and U.S. Provisional Patent Application No. 61/302,743, filed on Feb. 9, 2010 and entitled "Systems, Methods, and Computer Program Products for Verification of Image Level Backups", which are incorporated by reference herein in their entireties.

The methods, systems, and computer program products described herein perform image level backup recovery that substantially obviate one or several of the disadvantages of traditional approaches.

Embodiments of the invention include a system for instant recovery of a VM from an image level backup to a production environment without prior restorations of data from a backup file to production storage. For example, the system can immediately start a MICROSOFT™ Exchange server stored in a compressed and deduplicated image level backup file stored on arbitrary storage, in a production environment without having to first extract the entire MICROSOFT™ Exchange server image from the image level backup and move the extracted data over to production storage.

Embodiments of the invention additionally use virtual storage to provide access to data stored inside of image level backup files (i.e., disk images and configuration files) during the recovery process. This allows the system to be fully storage-agnostic, and not require that the image level backup data is stored on the device with snapshot capabilities and/or in the native (uncompressed) format.

In an embodiment, the instant recovery method does not require performing a full restore of the backup file to the production storage before the recovered computer can be started, and therefore, does not require waiting for such extraction to complete before applications computer and its applications are made available to users.

Embodiments of the invention additionally provide a number of methods to migrate a running server to production storage with zero or little downtime, wherein any downtime is limited to a scheduled maintenance window.

Embodiments of the invention additionally include a computer-readable medium having computer-executable instructions stored thereon that, in response to execution by a computing device, cause the computing device to perform operations for instant VM recovery from an image level backup.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

Figure 1:
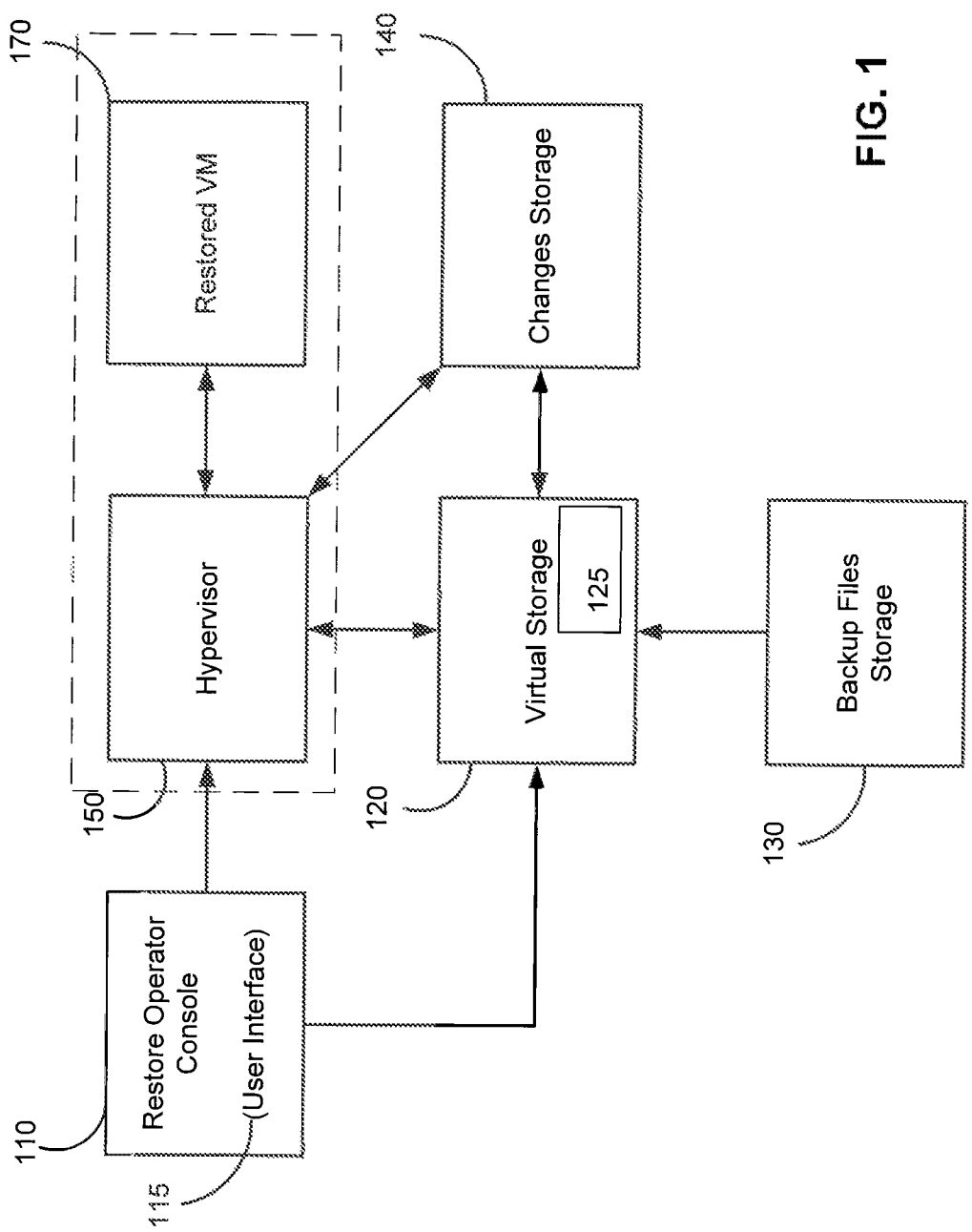
FIGS. 1-3 illustrate modular views of instant recovery system architectures, in accordance with embodiments of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, a restore operator, and an administrator are interchangeably used herein to identify a human user, a software agent, or a group of users and/or software agents. Besides a human user who needs to restore data objects from image level backups, a software application or agent sometimes needs to recover VMs from image level backups. Accordingly, unless specifically stated, the terms "operator," "administrator," and "user" as used herein do not necessarily pertain to a human being.

As used herein, in an embodiment, the term "server" encompasses computing devices that are designed to function as one or more of email servers, Domain Name System (DNS) servers, Domain Controller (DC) servers, application servers, database servers, web servers, firewall servers, and other enterprise servers, file servers, back end servers, and regular desktops. A server may be comprised of one or more server machines. A server may be implemented as collection of servers such as a server form or server cluster. For example, web servers may be commercially available server machines with one or more central processing units (CPUs). Alternatively, these web servers may comprise multiple computing devices and/or computing functionality hosted on multiple server machines (i.e., a server farm).

The present invention relates to improved systems, methods, and computer program products for instant recovery of servers from image level backups.

Instant Recovery System Architectures

FIG. 1 depicts system architecture 100 for instant recovery, in accordance with an embodiment of the invention. A restore operator console 110 includes a user interface (UI) 115 for backup recovery operators. In an embodiment, the UI 115 may be displayed on computer display 1130 shown in FIG. 11. UI 115 can be used to select a backup to be restored, a restoration point, hypervisor to restore the server to, and additional restore parameters. Restore operator console 110 is also used to configure and manage components of instant recovery system architecture 100.

In embodiments of the invention, a virtual storage 120 can be implemented in the form of a process, a software agent, an application, a virtual machine (VM), hardware, a software appliance, or a combination of hardware and software that allows representing either the entire or partial raw data content of a requested image level backup. In an embodiment, virtual storage 120 includes an application or process 125 (also referred to herein as "data conversion engine" 120) that enables representation of either the entire (or partial) raw data content of the required virtual disk or configuration file from image level backup file located in backup files storage 130.

As used herein, "virtual storage" refers to logical storage that has been abstracted and separated from physical storage, such as network attached storage (NAS), file servers, disks, and other physical storage devices. In an embodiment "virtual storage" is logical storage implemented via virtual storage logic and is viewable within a virtual infrastructure as a storage device containing VM configuration files and one or more virtual disk files, which are separated from physical storage disks. As used herein, a "virtual machine" (VM) is a software implementation of a machine such as a server, computer, or other computing device that supports the execution of a complete operating system (OS) and executes application programs like a physical machine.

A VM is a software implementation that duplicates the functionality of a physical machine implemented in hardware and software. Software applications and the OS running on a VM are limited to the resources and abstractions provided by the VM. In an embodiment, virtual machines (VMs) are viewable within an overall virtual infrastructure. According to an embodiment of the invention, the requested backup file to be verified can be located in local storage (not shown) or backup files storage 130. In the exemplary embodiment depicted in FIG. 1, backup files storage 130 is used to store full computer image files corresponding to a full image level backup of a computer or server. These backup files are typically highly compressed and de-duplicated to reduce the amount of storage required; in some cases, they are also encrypted for security reasons. Virtual storage 120 can be made available to hypervisor 150 via public or proprietary storage access protocols such as, but not limited to the Network File System (NFS), Common Internet File System (CIFS), Internet Small Computer System Interface (iSCSI).

Restore operator console 110 communicates with a virtual environment implemented on a virtual machine monitor (VMM) or hypervisor 150. As would be understood by one skilled in the relevant art(s), hypervisor 150 may be implemented as software or a combination of hardware and software to implement platform-virtualization software that allows multiple operating systems (OSs) to run concurrently on a single host computer. Virtual storage 120 is accessible by hypervisor 150 that supports the same storage type and format as virtual storage 120 is configured to emulate. Hypervisor 150 performs virtual disk image read operations from virtual storage 120 and writes changed virtual disk data into virtual storage 120, or directly to the changes storage 140 using hypervisor's native I/O redirection techniques. Changes storage 140 stores virtual disk image data changes inflicted by the running OS, applications and users. The written data can also be read back by hypervisor 150, in cases when hypervisor needs to access changed virtual disk image data blocks. Thus, the exposed images residing inside backup files remain read only and intact on the backup storage.

Virtual storage 120 handles these operations using appropriate formats and stores the modified disk image data on changes storage 140. In accordance with embodiments of the present invention, changes storage 140 can be implemented in the following different ways. Changes storage 140 can be implemented using virtual storage 120 logic by intercepting and re-directing write input/output (I/O) using file system level drivers or similar I/O redirection techniques to physical storage available to virtual storage 120 logic. Changes storage 140 can also be implemented using 'snapshot' disk I/O redirection capabilities of hypervisor 150 (snapshot, non-persistent disk etc.), when all data changes inflicted by the running VM are redirected to designated physical storage by hypervisor 150 itself, instead of being committed into a virtual disk image. In an embodiment, hypervisor 150 can create a snapshot of a disk image to protect the disk image from data changes associated with the instant recovery process. Finally, changes storage 140 can be implemented using capabilities of backup file storage 130, for example, using storage area network (SAN) snapshots.

Once virtual storage 120 is fully initialized and running, restore operator console 110 issues a command to configure hypervisor 150 and attach virtual storage 120 to hypervisor 150. Once selected one or more VM is published via Virtual Storage 120, this datastore will show a repository of files representing backed up virtual machine. This approach enables hypervisor to access all VM files (i.e. configuration, snapshots, auxiliary files), which in turn enables full hypervisor capabilities for the VM published in this manner. For example, this approach enables using VMWARE™ Storage VMotion to seamlessly migrate the published VM files to another datastore available to hypervisor.

Hypervisor 150 is used to start up the restored VM 170 using VM image and data files from the image level backup. In accordance with embodiments of the invention, hypervisor 150 can be, but is not limited to VMMs such as VMWARE™ Player, MICROSOFT™ VirtualPC, SUN™ VirtualBox, VMWARE™ ESX/ESXi, MICROSOFT™ Hyper-V, CITRIX™ XENServer, PARALLELS™ and other hypervisors 150. As would be apparent to one of skill in the art, other hypervisors 150 and virtualization solutions can be used as well.

At this point, the restored VM 170 and all applications running inside it become available to users. As restored VM 170 runs, any VM disk changes inflicted by the running operating system (OS), applications, and user activity are being accumulated in changes storage 140.

Figure 2:
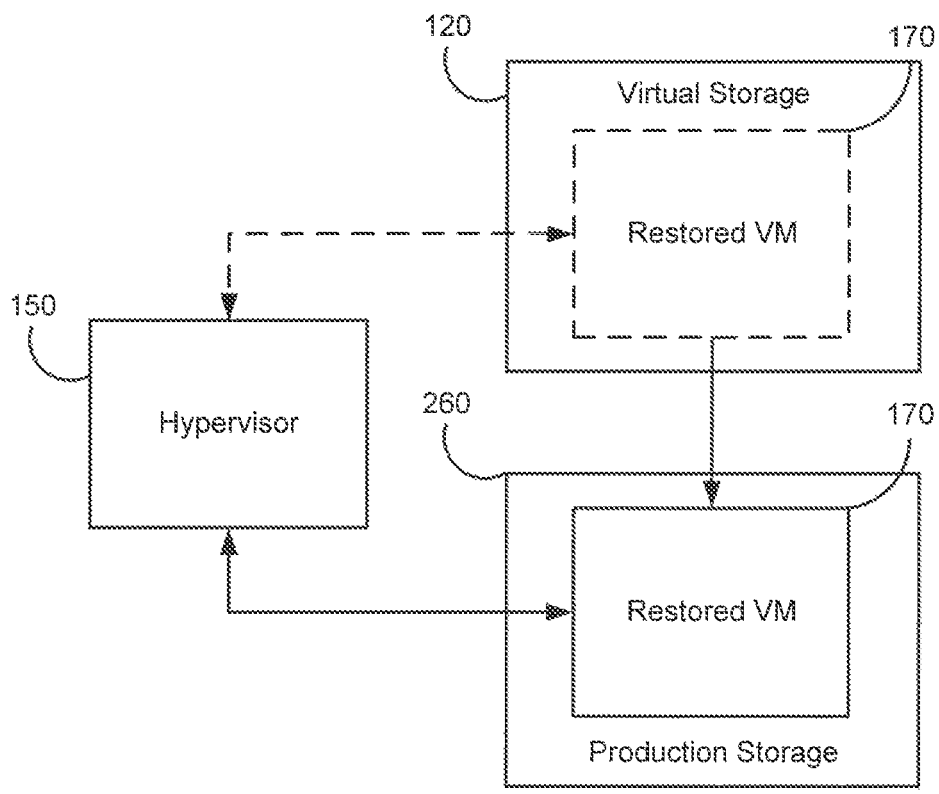

In order to complete the recovery, at some point the recovery operator needs to completely move the VM disk images and data files of virtual storage 120 to production storage 260 depicted in FIG. 2. This process migrates actual VM disk state (taking into account changed disk data blocks accumulated in changes storage 140) to prevent the loss of data generated while the VM was running from the virtual storage 120. This migration process is described below with reference to FIGS. 2 and 3.

FIG. 2 illustrates an exemplary system architecture used for instant VM recovery. FIG. 2 is described with continued reference to the embodiment illustrated in FIG. 1. However, FIG. 2 is not limited to that embodiment.

Figure 3:
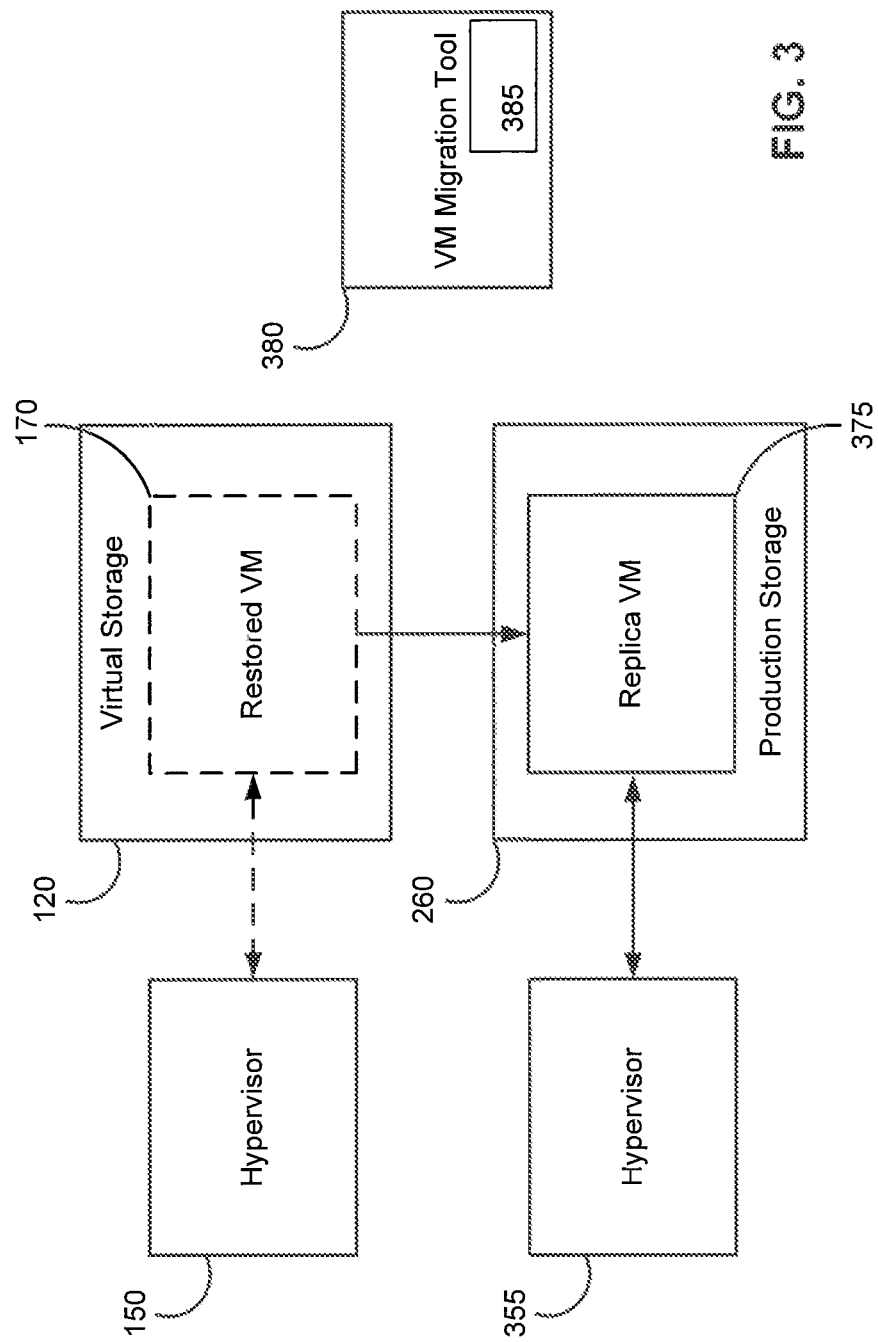

As shown in FIG. 2, restored VM 170 in virtual storage 120 is migrated to production storage 260 using hypervisor 150. In the embodiment depicted in FIG. 3, the migration may be performed using VM migration tool 380. According to an embodiment, VM migration tool 380 may include an recovery finalization module 385 that coordinates the instant recovery of the restored VM 170. In other embodiments, recovery finalization module 385 is implemented separately from the migration tool 380, and may include the logic to initiate the launch and operation of restored VM 170. Replica VM 375 has the same contents as restored VM 170. FIG. 3 also depicts a production hypervisor 355, which is instructed to configure and register with replica VM 375.

FIG. 2 depicts system architecture used to achieve migration of the contents of restored VM 170 in virtual storage 120 to production storage 260 with no downtime. According to an embodiment, to perform such migration to production storage 260 with no downtime, technologies similar to VMware Storage VMotion may be used with the present invention. Such technologies allow seamless migration of a VM, such as restored VM 170, from one storage to another, if both storage devices are connected to the same hypervisor host. In the exemplary embodiment depicted in FIG. 2, virtual storage 120 storing restored VM 170 and production storage 260 where restored VM 170 is copied to are both connected to and accessible by hypervisor 150. Restored VM 170 continues to run normally while the migration to production storage 260 shown in FIG. 2 is taking place, and after it has been completed, so that there is no downtime.

FIG. 3 illustrates an exemplary system architecture used for another migration method involving short downtime as part of instant VM recovery. FIG. 3 is described with continued reference to the embodiments illustrated in FIGS. 1 and 2. However, FIG. 3 is not limited to those embodiments.

Another way to perform the migration described above involves a short downtime that is scheduled to occur during a scheduled maintenance window. For example, if a maintenance window has been scheduled for software or hardware installations or upgrades, the architecture depicted in FIG. 3 can be used to migrate restored VM 170 in virtual storage 120 to replica VM 375 in production storage 260 during the time scheduled for the software/hardware maintenance. This includes leveraging an additional VM migration tool 380 depicted in FIG. 3. FIG. 3 depicts a system architecture corresponding to this exemplary embodiment. For example, VM migration tool 380 providing replication functionality to replicate a VM from virtual storage 120 to production storage on the same or different hypervisor host can be used as part of an instant recovery. One example of a migration tool providing such replica and failover capabilities is the VEEAM™ Backup and Replication product. In an embodiment of the invention, after replica VM 375 has been created, a restore operator shuts down running restored VM 170, and then performs a failover to replica VM 375 located on production storage 260.

According to an embodiment, another way to perform the migration with longer downtime involves shutting down the VM during the maintenance window, and using existing tools such as VEEAM™ FastSCP or VMware Converter to copy VM files from virtual storage 120 to production storage 260. Despite the fact that time to complete this copying be similar to the speed of "traditional" restorations, it will still be completed during a scheduled maintenance window. This enables recovery to occur during planned downtime off-hours within a maintenance window as opposed to unplanned down time, which is detrimental to organizations due to critical system resources being unavailable during peak usage hours.

In an embodiment of the invention, an instant recovery system incorporates the architectures depicted in FIGS. 1-3. For example an instant recovery system including a server (see computer system 1100 illustrated in FIG. 11) hosting a recovery application may be used. Although a dedicated server is can be used to host a recovery application as part of a recovery system, it is understood that the recovery application may reside on a shared application server (not shown).

The operations of system are described with reference stages 1-5 below. In an embodiment, the stages may correspond to steps of flowchart 400 discussed below with reference to FIG. 4. An image-level backup of production servers is performed by a backup application at stage 0 (i.e., at some point in time in the past), and the produced image level backup is saved in backup storage. In accordance with an embodiment of the invention, backup storage can be backup files storage 130.

According to an embodiment, at stage 1, a disaster happens affecting a mission-critical production server, and recovery must be performed quickly (i.e., an 'instant' recovery is needed). A restore operator (user), using UI 115 within restore operator console 110 chooses a backup file containing backup of affected VM, a restoration point to restore, and hypervisor host to restore VM to (and any additional hypervisor-specific parameters). Virtual storage 120 is then configured according to the user's selections in restore operator console 110 by mounting (connecting to) the required backup files from backup files storage 130. Once the required backup files are mounted, virtual storage 120 can then start to respond to data requests over the network. At the end of stage 1, virtual storage 120 appears on the network and is ready to serve remote requests.

At stage 2, hypervisor 150 is instructed to connect virtual storage 120 to itself. Virtual storage provides the requested raw data blocks by extracting the required portions of data from the backup file on the fly as they are requested by hypervisor. After the storage is mounted, hypervisor 150 is instructed to configure and register with virtual environment restored VM 170 using the VM data files located in virtual storage 120. In an embodiment, restored VM 170 can be any enterprise application server, such as, but not limited to, a MICROSOFT™ Exchange email server.

At stage 3, restored VM 170 is started. Once the operating system (OS) inside restored VM 170 fully boots up and is running, users can start accessing applications running in the VM normally, while the VM is running from the backup file.

At stage 4, a restore operator performs migration of restored VM 170 disk image and data files from virtual storage 120 to production storage 260, using one of the methods described above with reference to FIGS. 2 and 3. Depending on the method and options available to user with given hypervisors 150 and 355, this process can be initiated immediately and have no impact on running applications thus resulting in no downtime, or can be postponed to the next scheduled maintenance windows and result in some downtime limited to a maintenance window.

At stage 5, in case where "cold" migration was used in stage 4, replica VM 375 is started in production storage 260. Once the operating system (OS) inside replica VM 375 fully boots up and is running, users can start accessing applications running in the VM, which is now running from normal production storage.

As would be apparent to one of skill in the relevant art(s), the methods and systems described herein to perform fully automated instant recovery without requiring complete backup extraction or repetitive manual operations are much more efficient than manual recovery techniques or systems which require complete backup extraction in order to restore data objects from image level backups.

Instant Recovery Methods

Figure 4:
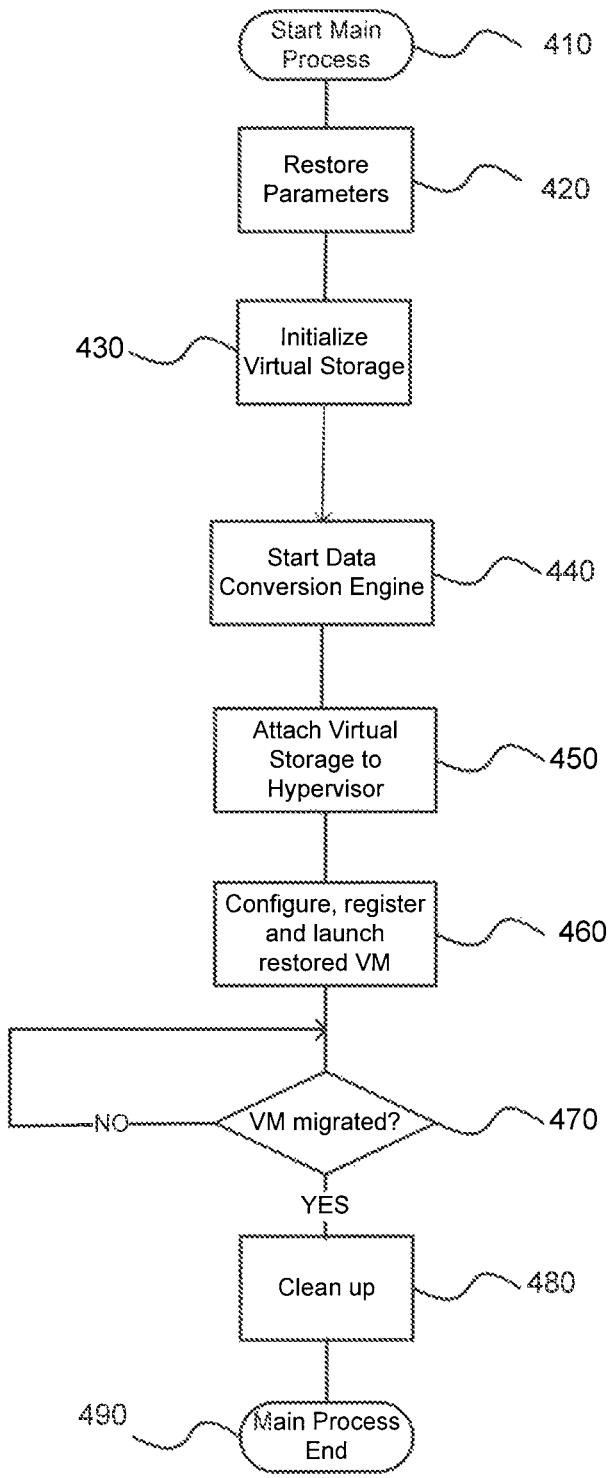
FIG. 4 is a flowchart illustrating steps by which instant recovery is performed, in accordance with an embodiment of the present invention.

FIG. 4 is a flowchart 400 illustrating steps by which a method is used to recover data objects from an image level backup, in accordance with an embodiment of the present invention.

More particularly, flowchart 400 illustrates the steps by which an instant VM recovery from an image level backup recovery is performed, according to an embodiment of the present invention. FIG. 4 is described with continued reference to the embodiments illustrated in FIGS. 1-3. However, FIG. 4 is not limited to those embodiments. Note that the steps in the flowchart do not necessarily have to occur in the order shown.

The method begins at step 410. When the method begins in step 410, an image-level backup of production servers or any other computers/servers has already been performed (i.e., at some past point in time), and the produced backup files have been put on a backup storage. In an embodiment, backup storage is backup files storage 130. In accordance with an embodiment, the image level backup was run with knowledge of what VMs are needed for a subsequent restore and recovery.

According to an embodiment, backup storage may be full image backup file storage 130 described with reference to FIG. 1 above. As would be appreciated by one of skill in the relevant arts, backup storage may be one or more file servers, Network-attached storage (NAS), a SAN, disk arrays, optical jukeboxes, or other storage devices.

In step 420, restore parameters are received. The restore parameters may include one or more of an image level backup file location, backup file entities to be restored in cases when a backup file contains multiple image backups, and a recovery point to restore. According to an embodiment, the restore parameters are received from a restore operator console 110 where an operator specifies restore parameters. In an embodiment of the invention, a recovery point can be a specific point in time, such an hour, minute or second of a day the backup was created. Alternatively, the recovery point can be a range of times or a date. The selected recovery points received in step 420 depend upon the frequency of full and incremental backups taken. For example, in environments where full image level backups are taken daily and incremental backups are taken hourly, the granularity of recovery points will be limited to selected hours of the day corresponding to the incremental backups. An exemplary interactive interface for receiving restore parameters described below with reference to FIGS. 5-10. According to an embodiment of the present invention, the interface shown in FIGS. 5-10 to receive recovery (i.e., restoration) selections can be used to perform step 420. After receipt of the restore parameters, the method proceeds to step 430.

In step 430, virtual storage 120 is started. In an embodiment, step 430 is performed when restore operator console 110 initializes virtual storage 120 by starting a storage service or a process, and attaches corresponding image level backup file(s) from backup files storage 130 or local storage (not shown). After virtual storage 120 is started, the method proceeds to step 440.

In step 440, a data conversion engine 125 starts. This engine presents the contents of backup files on virtual storage 120 (for example, by publishing files structure of files stored in backup). It also performs on-the-fly decompression, de-deduplication, decryption and/or any other operator or system specified operation required to translate portions of the backup file contents into raw data, as specific portions of this data are requested by external processes which access the virtual storage 120. Depending on selected restore point, reading data from multiple backup files located on backup storage 130 may be required. For example, content of first data block can be read from a full backup file, whereas second data block can be read from an incremental backup file.

In an embodiment, in cases when the full image level backup files contain multiple image level backups, the multiple image level backups may be viewed as separate entities in UI 115 and on virtual storage 120. For example, in UI 115, multiple image level backups may be displayed as multiple elements, while virtual storage 120 may contain multiple folders, each corresponding to and containing files of the specific VM. In one embodiment, after the data conversion engine translates the backup file contents, it presents the contents to hypervisor as a regular network attached storage showing all VM files located in the backup file. Step 440 enables greatly reduced times for VM recovery because instead of extracting an entire backup file, only requested data blocks are extracted, and only at the time they are requested (i.e., on-the-fly and as-needed). The exposed images residing in the backup files remain read-only during the method illustrated in flowchart 400. Thus, in one embodiment, all required virtual disk changes due to disk write operations are redirected to temporary storage using native hypervisor 150 functionality (if such functionality is provided by a specific hypervisor 150). Alternatively, all required virtual disk changes due to disk write operations may be redirected to available storage using virtual storage 120 (for example, in cases where hypervisor 150 lacks functionality to redirect virtual disk changes).

After the translation of selected portions of the image level backup is performed, and the backup file content list is available, the method proceeds to step 450.

In step 450, virtual storage 120 is attached to hypervisor 150. In accordance with an embodiment of the invention, this step can be performed when hypervisor configuration commands are received via restore operator console 110. For example, an operator, using UI 115 within restore operator console 110 can issue the corresponding hypervisor configuration commands. Step 450 is performed without making any changes to the backup file accessed in step 440. In this way, all virtual disk data changes inflicted during the instant recovery method is performed are stored in changes storage 140. After virtual storage 120 is attached to hypervisor 150, the method proceeds to step 460.

In step 460, restored VM 170 is configured, registered with a virtual environment, and launched. In cases when image-level backup file includes VM configuration files, data from these files can be used to ensure that VM is registered in the infrastructure with the same settings (e.g., virtual network) as it had at the time of backup. According to an embodiment, restored VM 170 is configured in a way so that the virtual disk files refer to corresponding files in virtual storage 120. Once the restored VM 170 is configured, registered and launched, the method proceeds to step 470.

In step 470, a determination is made as to whether restored VM 170 has been migrated to production storage 260. In this step, restored VM 170 continues to run for as long as required, while the recovery operator plans and execute the strategy of moving VM disk images and other data files to production storage 260. Virtual Storage 120 continues to serve input/output (I/O) requests for VM disk image data files, which enables successful and seamless migration of the VM. If it is determined by an operator or a monitoring program that restored VM 170 has been migrated to production storage 260, control is passed to step 480. If it determined that migration is not complete, step 470 is repeated.

In step 480, the hypervisor 150 configuration is cleaned up. In this step, virtual storage 120 is disconnected from hypervisor and changes storage 140 data is deleted.

The instant recovery process stops and the method ends in step 490.

Example Instant Recovery User Interface

FIGS. 5-10 illustrate a graphical user interface (GUI), according to an embodiment of the present invention. The instant recovery GUI depicted in FIGS. 5-10 is described with reference to the embodiments of FIGS. 1-4. However, the GUI is not limited to those example embodiments. For example, the GUI may be the UI 115 within restore operator console 110 used to select recovery parameters, as described in step 420 above with reference to FIG. 4. The GUI may also be a UI for hypervisor 150 used to configure, register, and launch restored VMs 170 as described in step 460 above with reference to FIG. 4.

Although in the exemplary embodiments depicted in FIGS. 5-10 the GUI is shown as an interface running on a computer terminal, it is understood that the GUI can be readily adapted to execute on a display of other platforms such as mobile device platforms running various operating systems, or another display of a computing device. For example, in an embodiment of the invention, the GUI illustrated in FIGS. 5-10 can be displayed on a mobile device having an input device and a display.

Throughout FIGS. 5-10, displays are shown with various icons, command regions, buttons, and data entry fields, which are used to initiate action, invoke routines, launch displays, enter data, view data, or invoke other functionality. The initiated actions include, but are not limited to, selecting restore parameters, selecting restored VMs 170, launching restored VMs 170, and displaying recovery results. For brevity, only the differences occurring within the figures, as compared to previous or subsequent ones of the figures, are described below.

Figure 5:
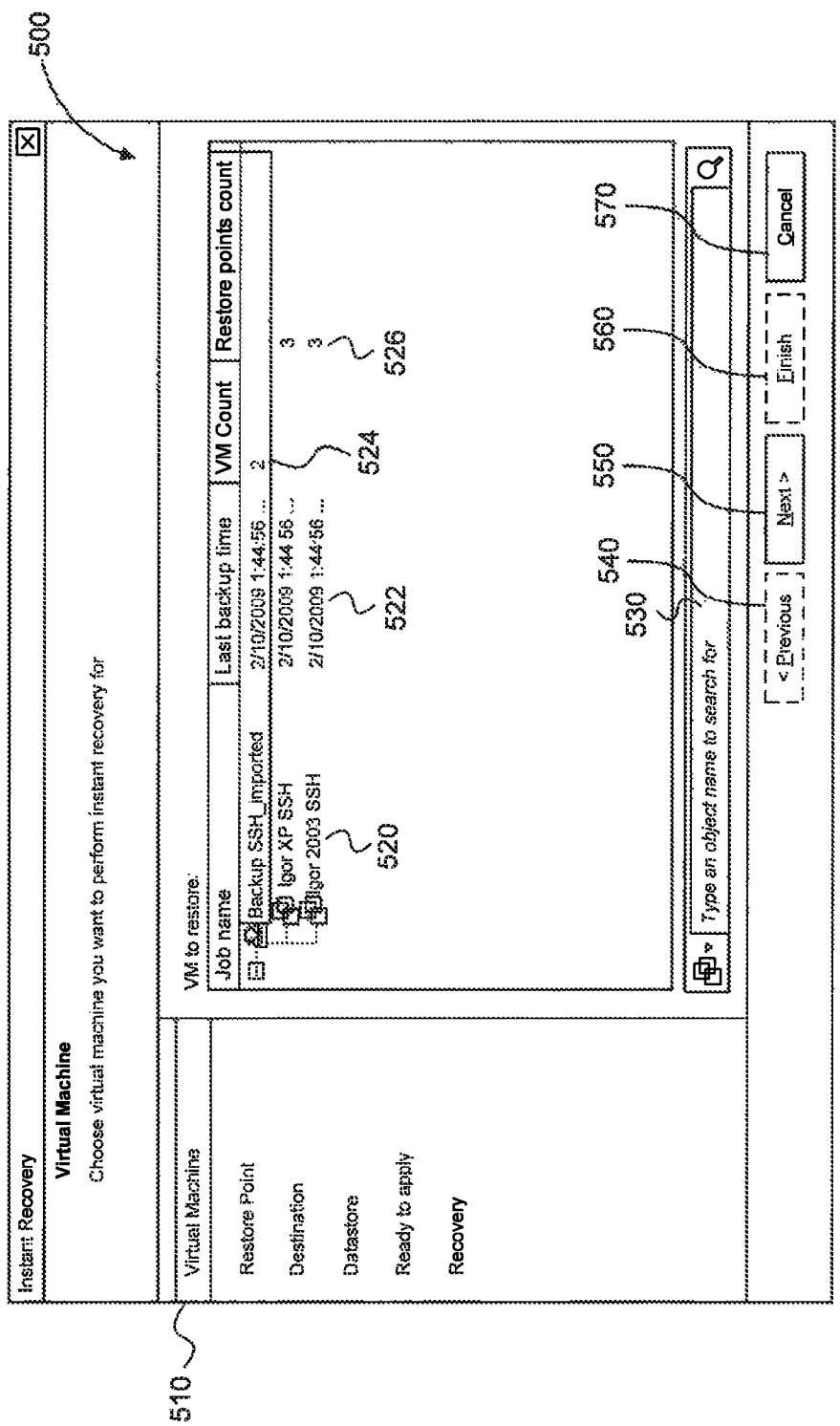
FIGS. 5-10 illustrate an exemplary graphical user interface (GUI), wherein the instant recovery process can be configured, in accordance with an embodiment of the invention.

FIG. 5 illustrates an exemplary VM selection interface 500, wherein, for example, upon choosing a virtual machine option 510 one or more file system data objects from production storage 260 of a VM to be restored can be displayed and selected by a restore operator. As described below and illustrated in FIG. 5, VM selection interface 500 can be used to select one or more VMs to restore as part of an instant recovery.

According to an embodiment, by entering a VM object name, using an input device (not shown), in search dialog 530, a restore operator can search for or browse a list of VMs displayed within VM selection interface 500. In the embodiment depicted in FIG. 5, VMs are displayed with corresponding backup job details such as the backup job name 520, last backup time 522, a VM count 524 (i.e., the number of VMs included in the backup), and restore points count 526 (i.e., the number of restore points included in the backup). In an embodiment, a restore operator, using an input device (not shown), selects a displayed VM to be restored based upon the displayed backup job details. After selecting a VM to restore, a restore operator, using an input device (not shown), clicks Next button 550 to proceed with the next step of the instant recovery process. VM selection interface 500 can be used to select multiple VMs to restore. For example, through moving a pointer or cursor within VMs displayed in VM selection interface 500 as result of clicking on a backup job name 520, a restore operator selects one or more VMs to restore. According to an embodiment of the present invention, a restore operator can select one or more VMs (e.g., "Igor XP SSH" and "Igor 2003 SSH" in the exemplary embodiment of FIG. 5) by either typing in the VM name(s) in search dialog 530 or selecting backup job name(s) 520 corresponding to VM(s). A restore operator can cancel a selection of a VM by clicking on Cancel button 570. After selecting a VM to restore, a restore operator can click on Next button 550 to proceed with selecting a restore point for the selected VM. Previous button 540 and Finish button 560 are not selectable in VM selection interface 500 because it is the first interface in the instant recovery process.

Figure 6:
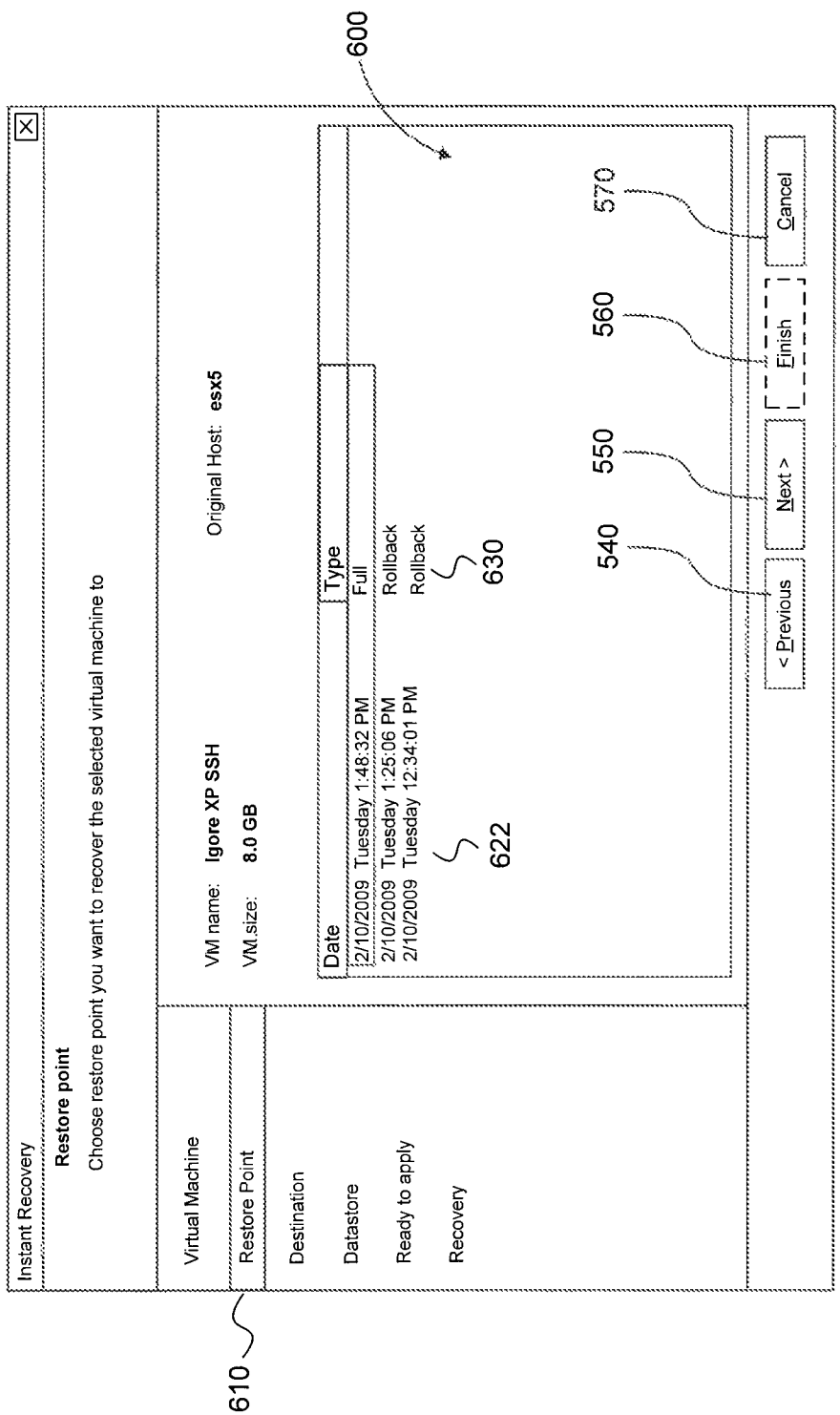

FIG. 6 illustrates an exemplary restore point selection interface 600, wherein, for example, upon choosing a restore point option 610 a restore point for a selected VM to be restored can be displayed and selected by a restore operator. As described below and illustrated in FIG. 6, restore point selection interface 600 can be used to select a specific point in time to restore a VM to.

In accordance with an embodiment of the invention, a restore operator can select a restore point for a selected VM (e.g., February 10 at 1:48 PM for VM "Igor XP SSH" in the exemplary embodiment of FIG. 6) by clicking on a restore point 622 using an input device (not shown). A backup type 630 is displayed in restore point selection interface 600 to indicate whether a backup is a full or rollback (incremental) backup. A restore operator can cancel a selection of a restore point by clicking on Cancel button 570. A restore operator can return to VM selection interface 500 by clicking on Previous button 540. After selecting a restore point, a restore operator, using an input device (not shown), clicks Next button 550 to proceed with the next step of the instant recovery process. Finish button 560 is not selectable in restore point selection interface 600 because it is not the last interface in the instant recovery process.

Figure 7:
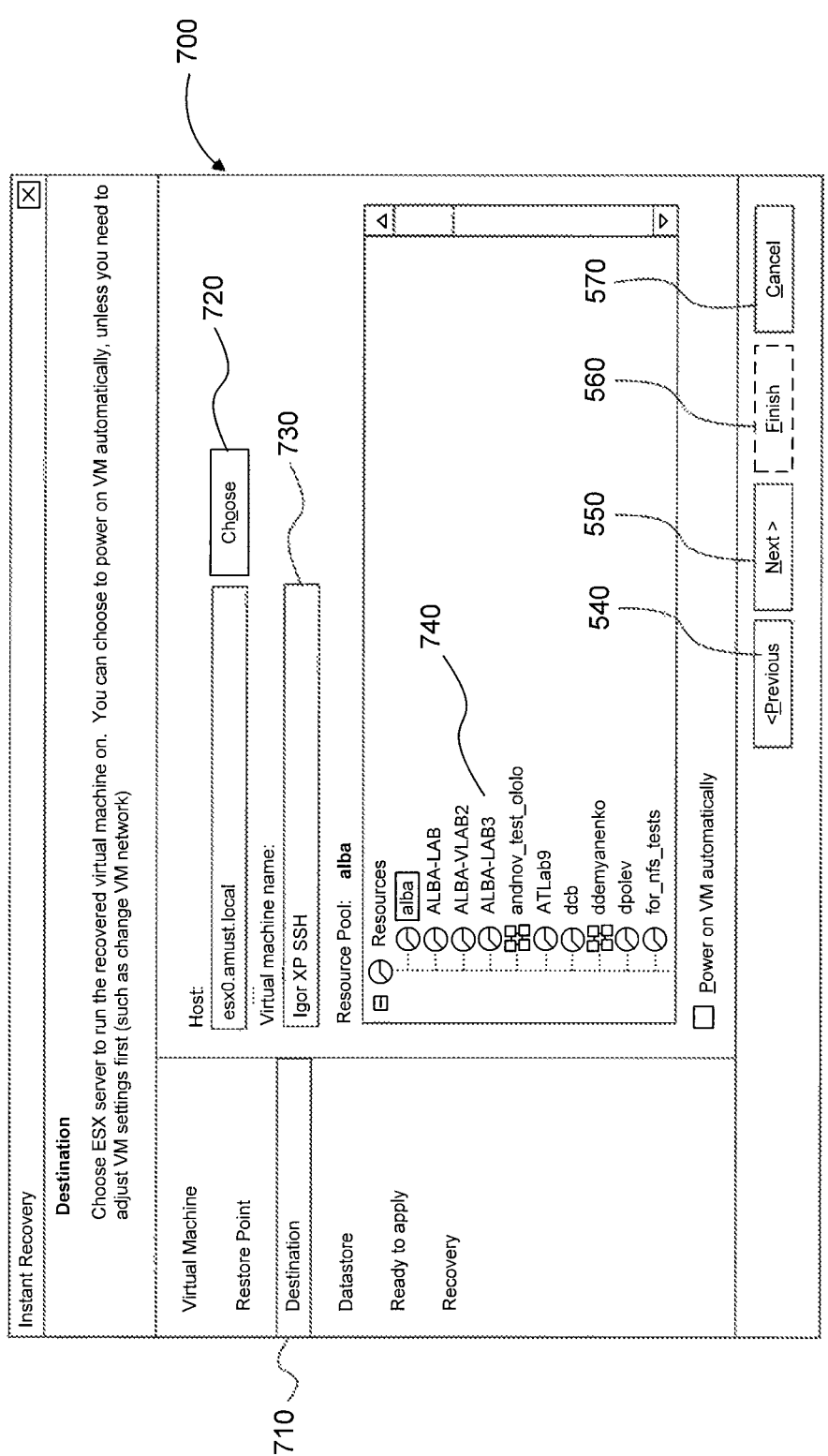

FIG. 7 illustrates an exemplary destination selection interface 700, wherein, for example, upon choosing a destination option 510 destination servers capable of running a restored VM can be displayed and selected by a restore operator. As described below and illustrated in FIG. 7, destination selection interface 700 can be used to select a specific server resource 740 to run a restored VM 170 on.

In accordance with an embodiment of the invention, a restore operator can select a host (e.g., the "esx0.amust.local" server in the exemplary embodiment of FIG. 7) by clicking on Choose button 720 using an input device (not shown). The original name of the VM selected in VM selection interface 500 (e.g., "Igor XP SSH") is displayed in VM dialog 730, and can be customized if the restored VM 170 needs to have a different name. Server resources 740 are displayed in destination selection interface 700 to indicate which resources within a given resource pool corresponding to the selected host are available. The displayed resources 740 from a resource pool may be used by a restore operator to determine which host to select. A restore operator can cancel a selection of a destination by clicking on Cancel button 570. As shown in FIG. 7, a restore operator can select a button below the list of server resources 740 to power on the VM automatically after it is restored. In an embodiment, the automatic power on button may be de-selected, if the restore operator needs to adjust VM settings, including, but not limited to network settings, before the VM is powered on. A restore operator can return to restore point selection interface 600 by clicking on Previous button 540. After selecting a host, a restore operator, using an input device (not shown), clicks Next button 550 to proceed with the next step of the instant recovery process. Finish button 560 is not selectable in destination selection interface 700 because it is not the last interface in the instant recovery process.

Figure 8:
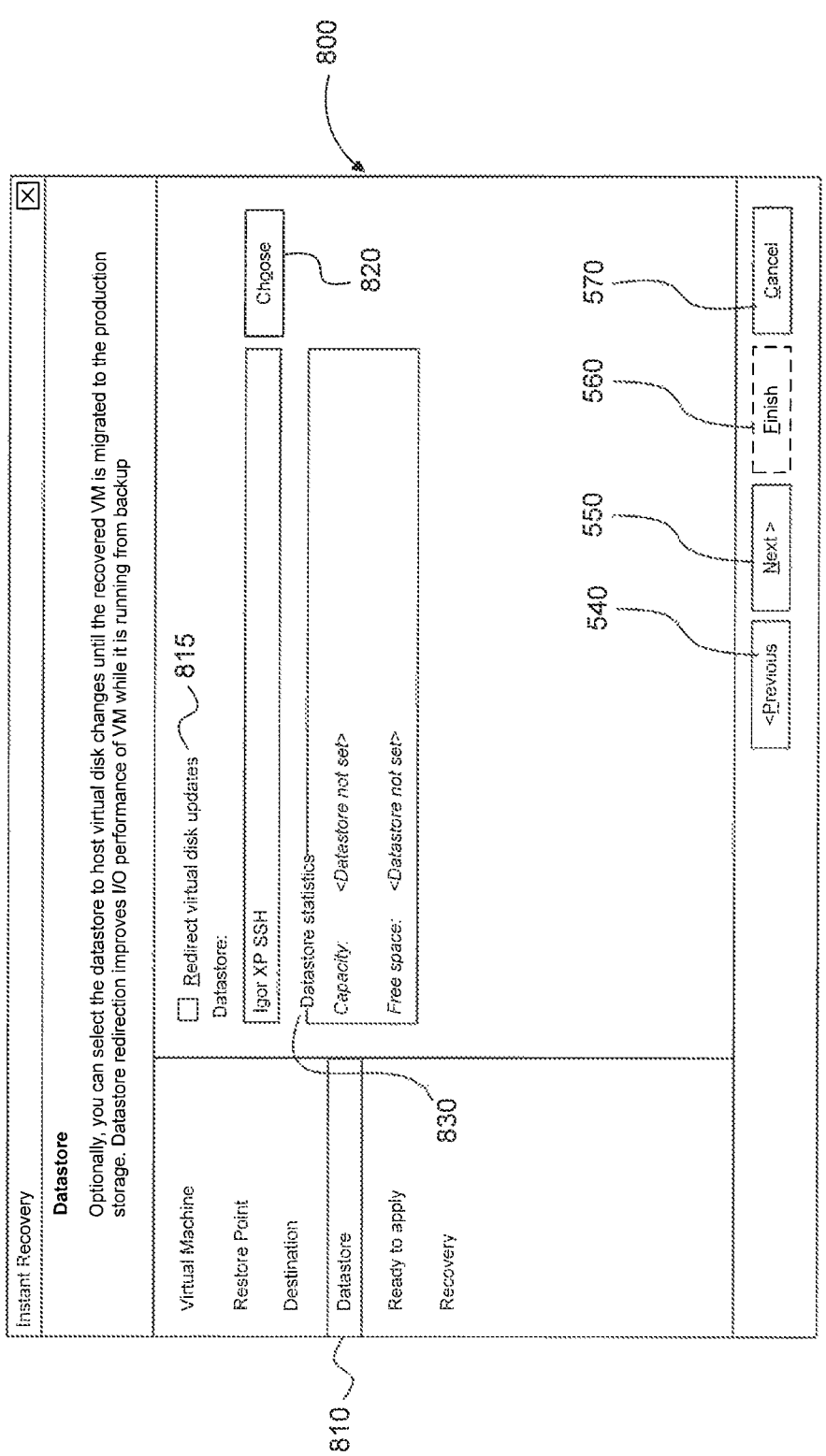

FIG. 8 illustrates an exemplary changes storage selection interface 800, wherein, for example, upon choosing a datastore option 810 a changes storage 140 data store can be displayed and selected by a restore operator. As described below and illustrated in FIG. 8, changes storage selection interface 800 can be used to select a specific data store to host virtual disk changes during VM migration to production storage 260.

In accordance with an embodiment of the invention, a restore operator can optionally select a different a changes storage data store (e.g., data stores available for "Igor XP SSH" in the exemplary embodiment of FIG. 8) by clicking on Choose button 820 using an input device (not shown). The VM selected in VM selection interface 500 (e.g., "Igor XP SSH") is displayed in changes storage selection interface 800. A restore operator can choose to redirect virtual disk changes during a VM migration to production storage 260 by clicking on Redirect button 815. If Redirect button 815 is selected and a data store is chosen by clicking Choose button 820, data store statistics 830 for the chosen data store are displayed in changes storage selection interface 800 to indicate the capacity and free space of the selected changes storage 140. A restore operator can cancel a selection of changes storage 140 by clicking on Cancel button 570. A restore operator can return to destination selection interface 700 by clicking on Previous button 540. After choosing a data store for changes storage 140, a restore operator, using an input device (not shown), clicks Next button 550 to proceed with the next step of the instant recovery process. Finish button 560 is not selectable in changes storage selection interface 800 because it is not the last interface in the instant recovery process.

Figure 9:
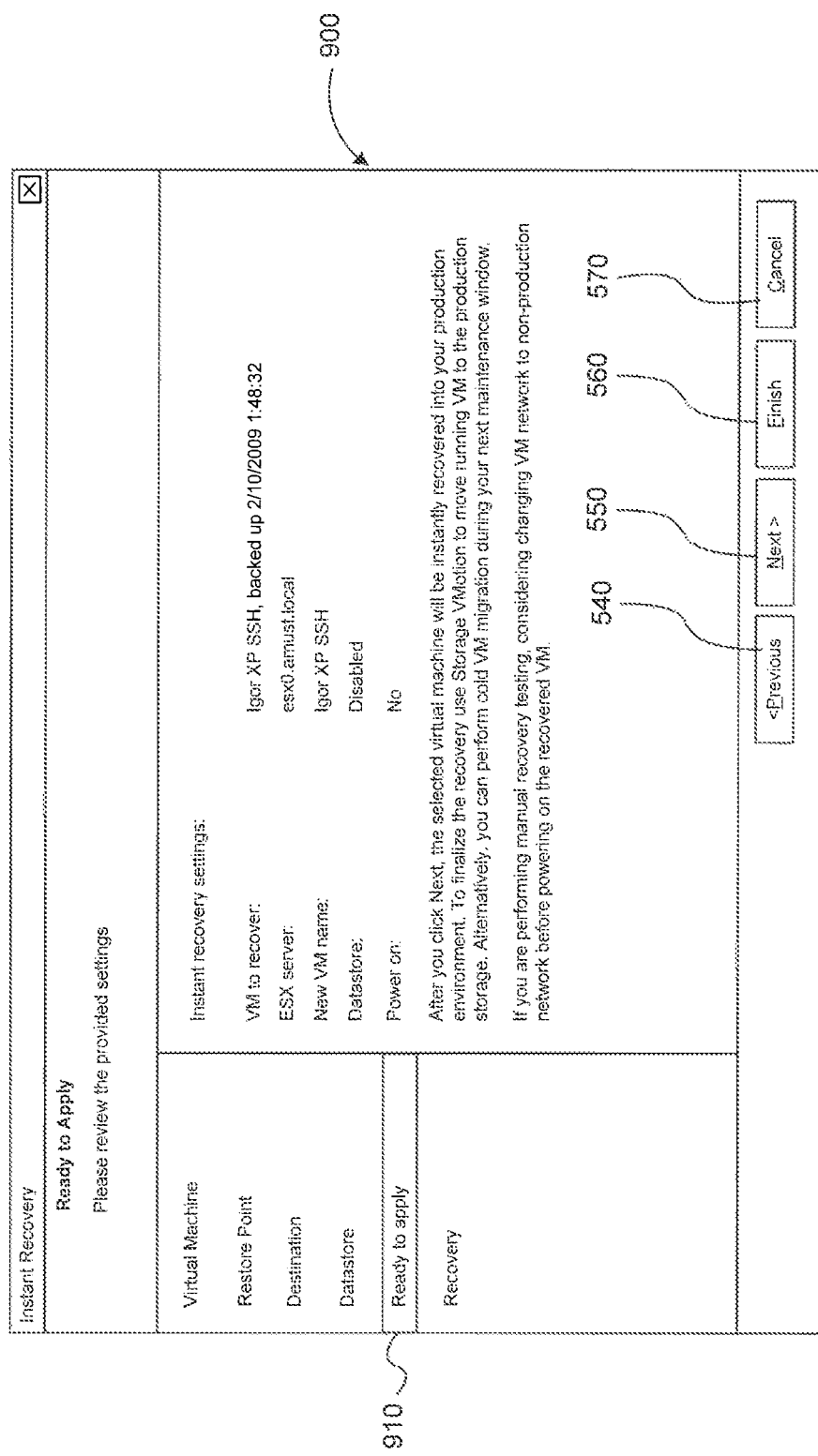

FIG. 9 illustrates an exemplary instant recovery settings interface 900, wherein, for example, upon choosing a ready to apply option 910 instant recovery settings are displayed for review by a restore operator. As described below and illustrated in FIG. 9, instant recovery settings interface 900 can be used to review the instant recovery settings, which are based on the selections made in the interfaces described with reference to FIGS. 5-8 above.

The VM selected in VM selection interface 500 (e.g., "Igor XP SSH") is displayed in instant recovery settings interface 900 along with the restore point selected in restore point selection interface 600 (e.g., February 10 at 1:48 PM) and the host (e.g., "esx0.amust.local") selected in destination selection interface 700. A restore operator can choose to redirect virtual disk changes during a VM migration to production storage 260 by clicking on Redirect button 815. If the restore operator chose to not power on the VM automatically in destination selection interface 700, this information is also displayed in instant recovery settings interface 900 (e.g., "Power on: No"). A restore operator can cancel an instant recovery by clicking on Cancel button 570. A restore operator can return to changes storage selection interface 800 by clicking on Previous button 540. After reviewing the instant recovery settings, a restore operator, using an input device (not shown), clicks Next button 550 to initiate instant recovery of the selected VM. A restore operator can then complete the instant recovery process by clicking on Finish button 560.

Figure 10:
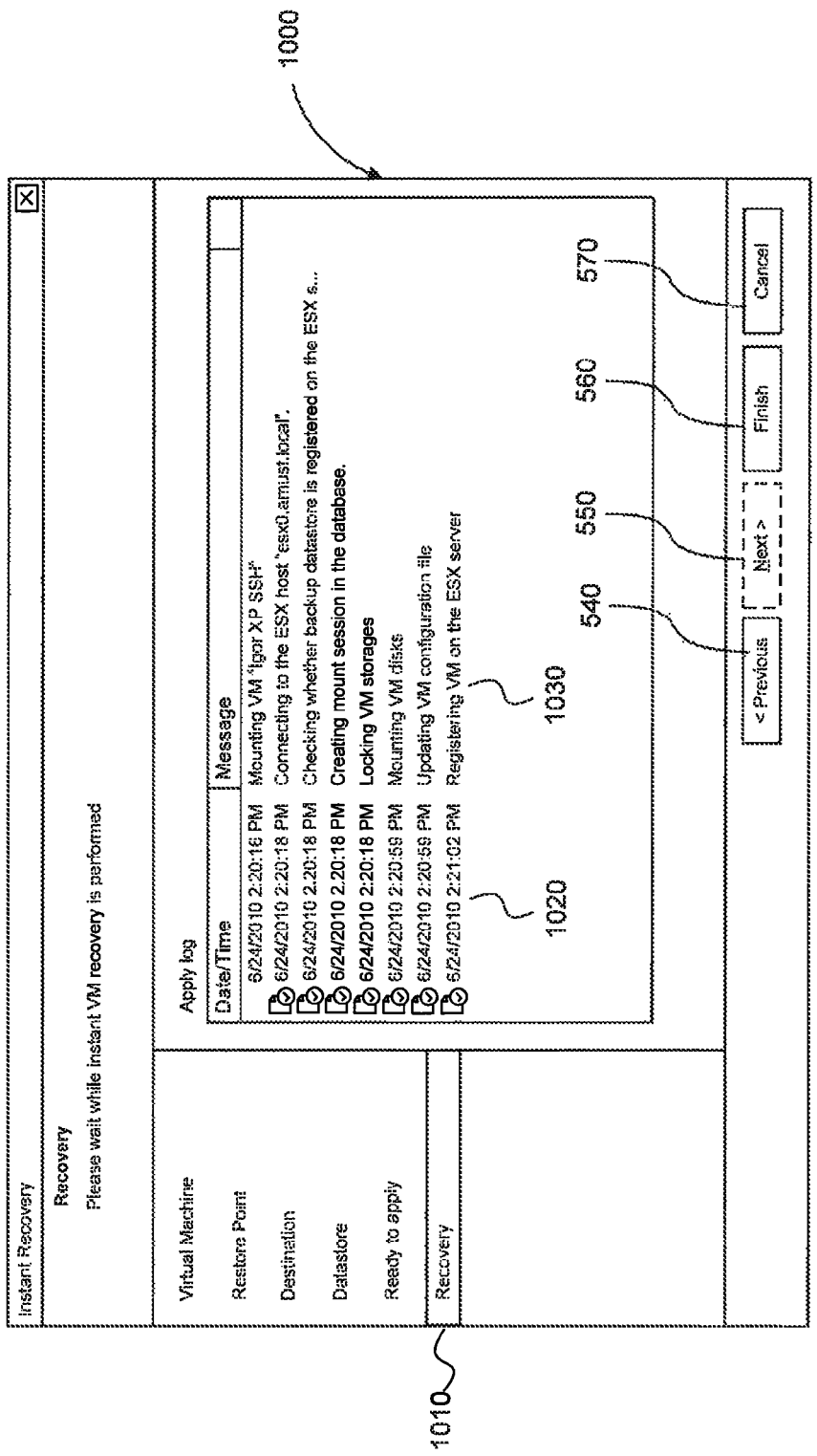

FIG. 10 illustrates an exemplary instant recovery results display 1000, wherein, for example, upon choosing a recovery option 1010 instant recovery results displayed for review by a restore operator. As described below and illustrated in FIG. 10, instant recovery results display 1000 can be used to review the instant recovery results as the recovery is performed.

Recovery results relating to the VM selected in VM selection interface 500 (e.g., "Igor XP SSH") are displayed in instant recovery results display 1000 along with timestamps 1020 related to status messages 1030 associated with stages of the recovery. A restore operator can cancel an instant recovery in process by clicking on Cancel button 570. A restore operator can then return to instant recovery settings interface 900 by clicking on Previous button 540. After reviewing the instant recovery results, a restore operator, using an input device (not shown), clicks Finish button 560 to exit the instant recovery GUI.

Example Computer System Implementation

Figure 11:
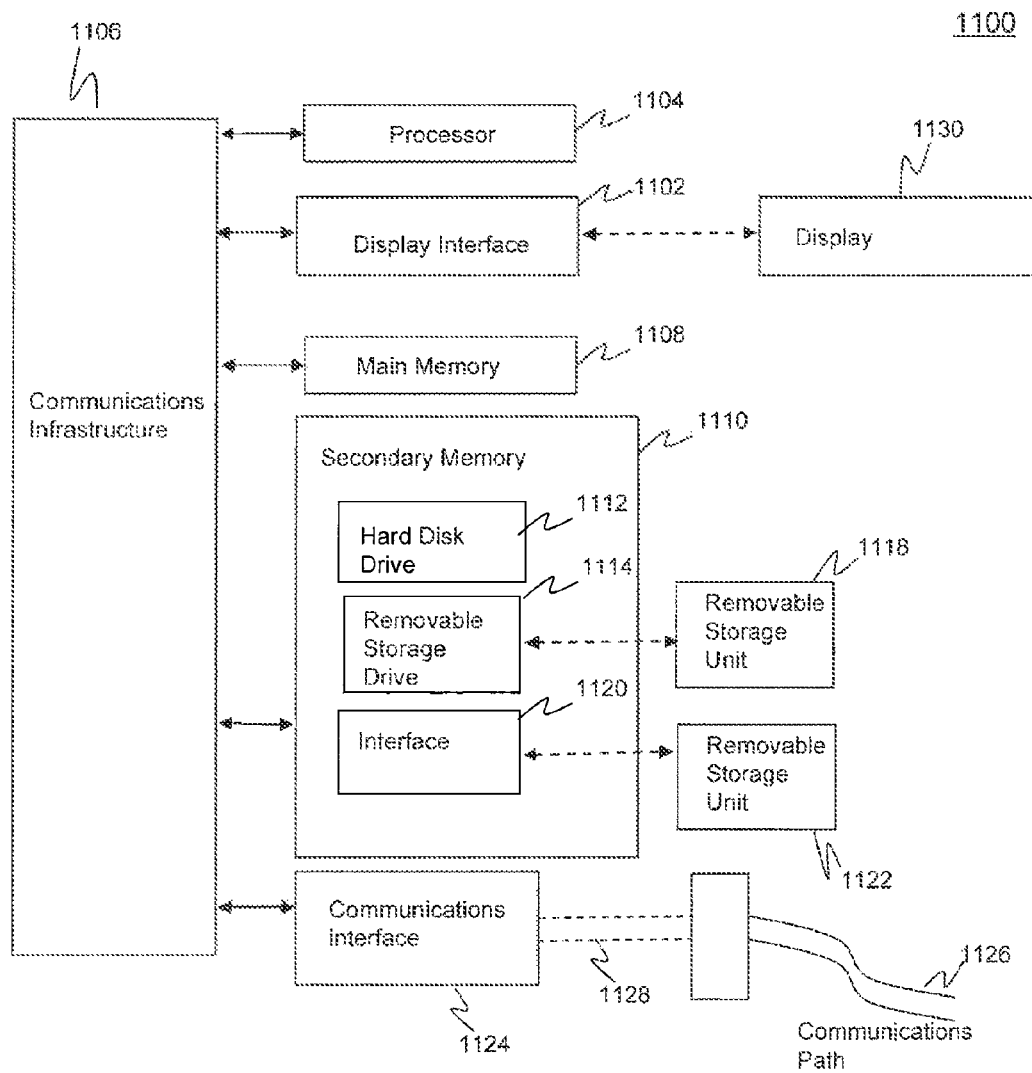
FIG. 11 depicts an example computer system in which the present invention may be implemented.

Various aspects of the present invention can be implemented by software, firmware, hardware, or a combination thereof. FIG. 11 illustrates an example computer system 1100 in which the present invention, or portions thereof, can be implemented as computer-readable code. For example, the methods illustrated by flowchart 400 of FIG. 4 can be implemented in system 1100. The instant recovery architecture 100 depicted in FIGS. 1-3 can also be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general-purpose processor. Processor 1104 is connected to a communication infrastructure 1106 (for example, a bus, or network).

Computer system 1100 also includes a main memory 1108, preferably random access memory (RAM), and may also include a secondary memory 1110. Secondary memory 1110 may include, for example, a hard disk drive 1112, a removable storage drive 1114, flash memory, a memory stick, and/or any similar non-volatile storage mechanism. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a non-transitory computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Soft ware and data transferred via communications interface 1124 are in the form of signals, which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

Computer system 1100 may additionally include computer display 1130. According to an embodiment, computer display 1130, in conjunction with display interface 1102, can be used to display UI 115 on restore operator console 110. Computer display 1130 may also be used to display the GUI interfaces depicted in FIGS. 5-10.

In this document, the terms "computer program medium," "non-transitory computer readable medium," and "computer usable medium" are used to generally refer to media such as removable storage unit 1118, removable storage unit 1122, main memory 1108, secondary memory 1110, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods illustrated by flowchart 200 of FIG. 2 and systems 300 and 400 of FIGS. 3 and 4 discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112, or communications interface 1124.

The invention is also directed to computer program products comprising software stored on any computer usable medium. Such software, when executed in one or more data processing device, causes a data processing device(s) to operate as described herein. Embodiments of the invention employ any computer usable or readable medium, known now or in the future. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system for recovering one or more virtual machines from an image level backup, comprising:
    a hypervisor configured to receive a selection of at least one virtual machine disk image file and at least one virtual machine configuration file corresponding to a virtual machine (VM) to be recovered, wherein the at least one virtual machine disk image file and the at least one virtual machine configuration file are included in the image level backup;
    a virtual storage communicatively coupled to the hypervisor and configured to receive contents of the image level backup from a data conversion engine;
    the data conversion engine configured to:
        receive a request for a data object from the hypervisor;
        determine at least one data portion of the image level backup, wherein the data portion includes the requested data object;
        perform content translation of the image level backup to extract contents of the data portion on-the-fly at the time the corresponding data object is requested by the hypervisor without fully extracting the image level backup; and
        represent the extracted contents in the virtual storage;
    wherein the hypervisor is configured to launch the VM, and wherein the hypervisor is configured to provide to the VM access to contents of the at least one virtual machine disk image the and the at least one virtual machine configuration file through the virtual storage; and
    a changes storage configured to store virtual disk data changes inflicted by recovery of the data object from the image level backup, wherein the changes storage is implemented using virtual storage logic.

2. The system of claim 1, further comprising:
    a recovery finalization module communicatively coupled to the hypervisor and configured to perform, using restore parameters and the changes storage, recovery of the VM.

3. The system of claim 2, wherein the recovery finalization module is further configured to move the VM from using the virtual storage to using a production storage.

4. The system of claim 1, wherein the data conversion engine is further configured to translate the extracted data portion from an image level backup file format to a second format, wherein the translated data portion is represented in the virtual storage in the second format, and wherein the second format is natively understood by the hypervisor.

5. The system of claim 1, wherein the hypervisor is configured for disk input output (I/O) redirection, and wherein the changes storage is implemented using the hypervisor or backup storage disk I/O redirection, and wherein the hypervisor or backup storage disk I/O redirection include the creation of snapshots.

6. The system of claim 2, further comprising a restore operator console having an interactive user interface.

7. The system of claim 6, wherein the recovery finalization module is accessible by the restore operator console and wherein restore parameters are provided through the interactive user interface.

8. The system of claim 2, wherein the restore parameters are one or more of:
    an image level backup file repository for the image level backup;
    backup file entities to be recovered in cases when the selected image level backup contains multiple image level backups corresponding to different restore points;
    one or more data objects to be recovered, wherein the data objects are within the image level backup, and wherein the data objects are associated with one or more applications;
    a recovery point; or
    a destination host.

9. The system of claim 8, wherein the recovery point is a specific hour, minute or second of a day the image level backup was created.

10. The system of claim 9, wherein the recovery point comprises a range of times or days corresponding to dates of available image level backups.

11. A method for recovering one or more virtual machines from an image level backup, comprising:
    receiving one or more restore parameters;
    initializing a virtual storage;
    receiving a selection of at least one virtual machine disk image file and at least one virtual machine configuration file corresponding to a virtual machine (VM) to be recovered, wherein the at least one virtual machine disk image file and virtual machine configuration file are included in an image level backup to restore from;
    performing content translation of the image level backup on-the-fly to extract a data portion so as to provide contents of the data portion to a hypervisor without fully extracting the image level backup, wherein the extracted data portion is represented in the virtual storage;
    attaching the virtual storage to the hypervisor;
    attaching a changes storage to the virtual storage or to the hypervisor, wherein the changes storage is configured to store disk data changes inflicted by recovery of the VM; and
    launching, by the hypervisor, the VM using the virtual storage.

12. The method of claim 11, further comprising:
    migrating the VM from the virtual storage to production storage.

13. The method of claim 11, further comprising generating an automated notification containing recovery results for the VM.

14. The method of claim 11, further comprising:
in response to determining that the VM has not been recovered successfully, generating an automated notification.

15. The method of claim 14, wherein the automated notification is one or more of:
an email message;
a log entry in a data file;
a Short Message Service (SMS) text message;
a fax;
an Instant Message (IM); or
an automated posting to a website.

16. The method of claim 11, further comprising, after displaying the results of creating the VM:
deleting data from the changes storage.

17. The method of claim 11, further comprising:
translating the extracted data portion from an image level backup file format to a second format, wherein the translated data portion is represented in the virtual storage in the second format, and wherein the second format is natively understood by the hypervisor.

18. A non-transitory computer-readable medium having instructions stored thereon that, when executed by one or more processors, cause the processors to perform operations to recover for recovering one or more virtual machines from an image level backup, the operations comprising:
receiving one or more restore parameters;
initializing a virtual storage;
accessing an image level backup to restore from;
receiving a selection of at least one virtual machine disk image file and at least one virtual machine configuration file corresponding to a virtual machine (VM) to be recovered, wherein the at least one virtual machine disk image file and virtual machine configuration file are included in the image level backup;
performing content translation of the image level backup on-the-fly to extract a data portion so as to provide contents of the data portion to a hypervisor without fully extracting the image level backup, wherein the extracted data portion is represented in the virtual storage;
attaching the virtual storage to the hypervisor;
providing contents of the extracted data portion to the hypervisor;
launching, from the hypervisor, the VM using the virtual storage; and
determining if the operating system (OS) of the VM has booted successfully.

19. The non-transitory computer-readable medium of claim 18, wherein the restore parameters are one or more of:
a VM to recover;
a recovery point; or
a changes storage data store.

20. The non-transitory computer-readable medium of claim 18, wherein the operations further comprising:
translating the extracted data portion from an image level backup file format to second format, wherein the translated data portion is represented in the virtual storage in the second format, and wherein the second format is natively understood by the hypervisor.

21. The non-transitory computer-readable medium of claim 18, wherein the operations further comprise:
migrating the restored VM from using the virtual storage to a production storage.

* * * * *

UNITED STATES PATENT AND TRADEMARK OFFICE
CERTIFICATE OF CORRECTION

| | | |
|---|---|---|
| PATENT NO. | : 8,566,640 B2 | Page 1 of 1 |
| APPLICATION NO. | : 13/185036 | |
| DATED | : October 22, 2013 | |
| INVENTOR(S) | : Timashev et al. | |

It is certified that error appears in the above-identified patent and that said Letters Patent is hereby corrected as shown below:

In the Claims:

Column 15, line 62, "image the and the" should be replaced with --image file and the--.

Column 18, line 25, "format to second" should be replaced with --format to a second--.

Signed and Sealed this
Seventh Day of January, 2014

Margaret A. Focarino
*Commissioner for Patents of the United States Patent and Trademark Office*